United States Patent
Mahaffy et al.

[15] 3,685,251
[45] Aug. 22, 1972

[54] AUTOMATIC PACKAGING APPARATUS WITH IMPROVED MEANS FOR CUTTING AND CONTOUR TRIMMING OF PACKAGES

[72] Inventors: Reid A. Mahaffy, Montclair; James B. Dunkerley, North Haledon; Joseph M. Psota, Hawthorne, all of N.J.

[73] Assignee: Mahaffy & Harder Engineering Company, Tolowa, N.J.

[22] Filed: March 26, 1970

[21] Appl. No.: 22,785

[52] U.S. Cl. .................. 53/184, 53/372, 83/566, 83/700
[51] Int. Cl. ...... B26d 1/02, B65b 47/10, B65b 61/10
[58] Field of Search .................. 53/184, 372, 373; 83/566–569, 679, 683, 657, 700

[56] References Cited

UNITED STATES PATENTS

| | | | |
|---|---|---|---|
| 3,238,691 | 3/1966 | Miller et al. | 53/184 X |
| 2,257,336 | 9/1941 | Feurt | 83/700 X |
| 3,129,545 | 4/1964 | Sloan et al. | 53/184 X |
| 3,111,877 | 11/1963 | Rugenstein | 83/657 |
| 2,523,178 | 9/1950 | Zeprun | 83/566 X |

FOREIGN PATENTS OR APPLICATIONS

| | | | |
|---|---|---|---|
| 231,888 | 6/1959 | Australia | 53/184 |

*Primary Examiner*—Theron E. Condon
*Assistant Examiner*—Neil Abrams
*Attorney*—Bryan, Parmelee, Johnson & Bollinger

[57] ABSTRACT

An automatic packaging machine of the type adapted to form packages from continuous rolls of plastic film, especially semi-rigid plastic films. The machine includes improved means and methods for cutting and contour trimming the otherwise finished packages as they move in sequence from the packaging machine, comprising heated knives mounted in one platen of a press and working against another platen of the press and working against another platen of the press arranged to cooperate with the knives.

10 Claims, 13 Drawing Figures

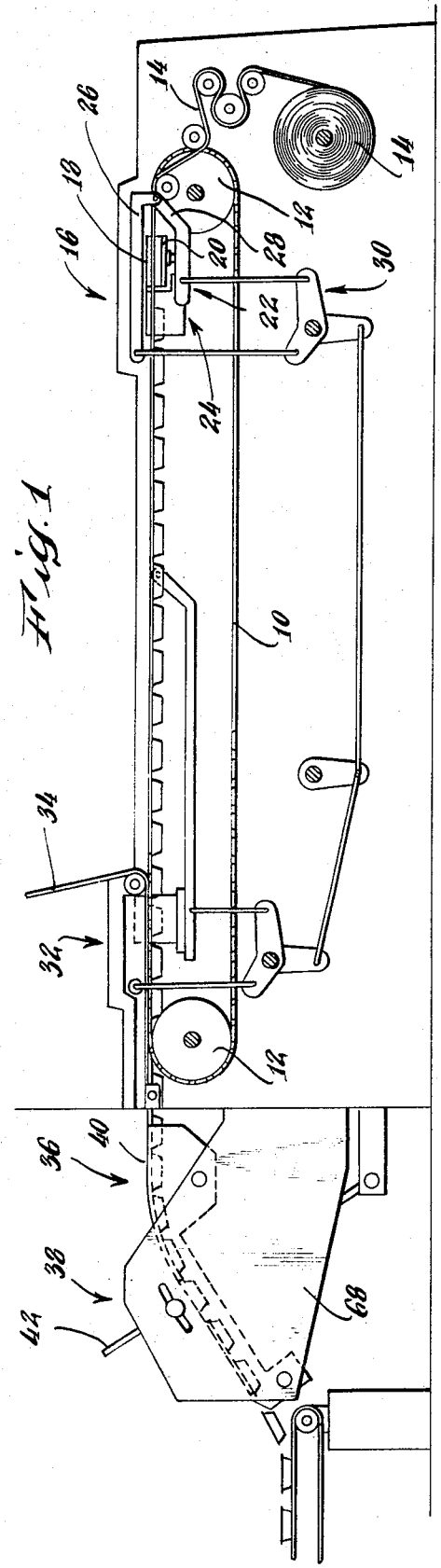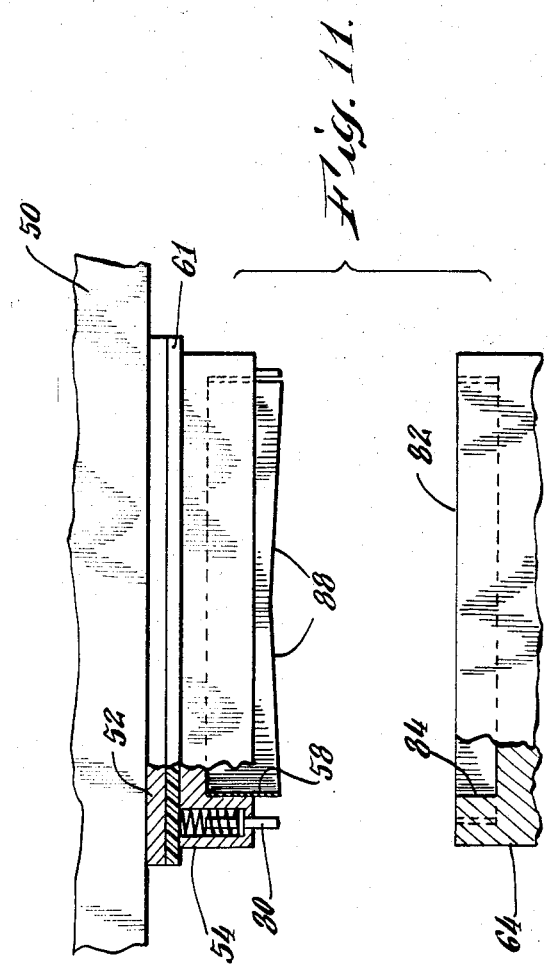

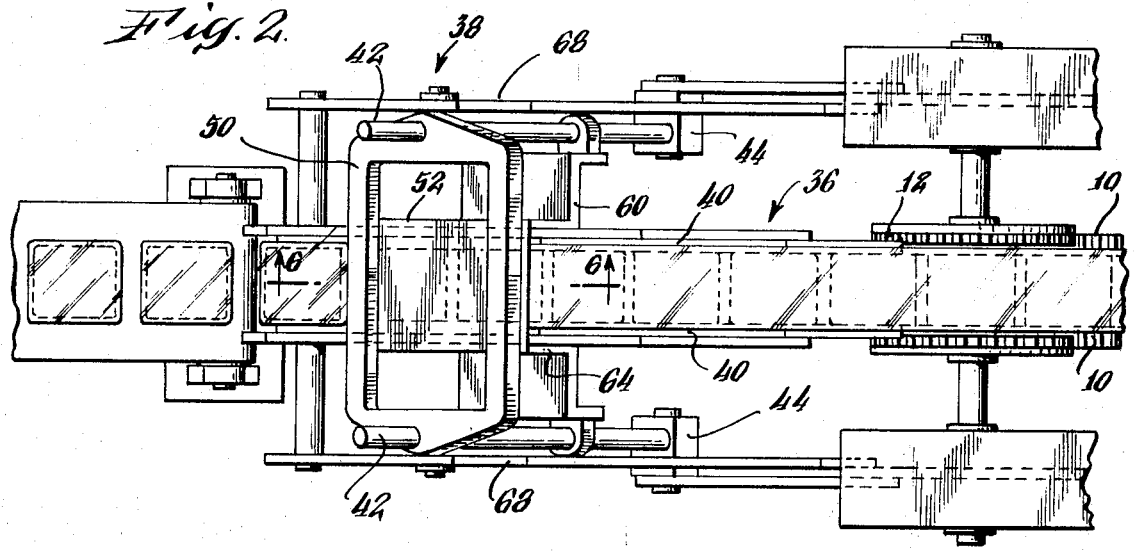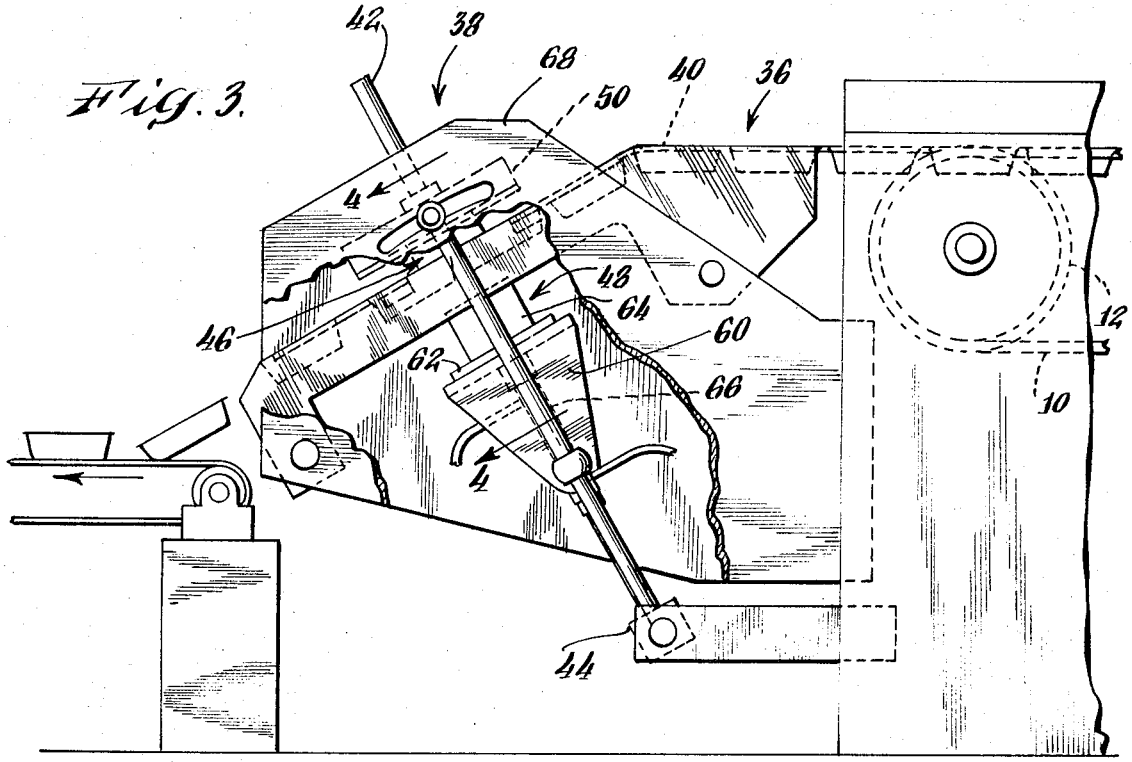

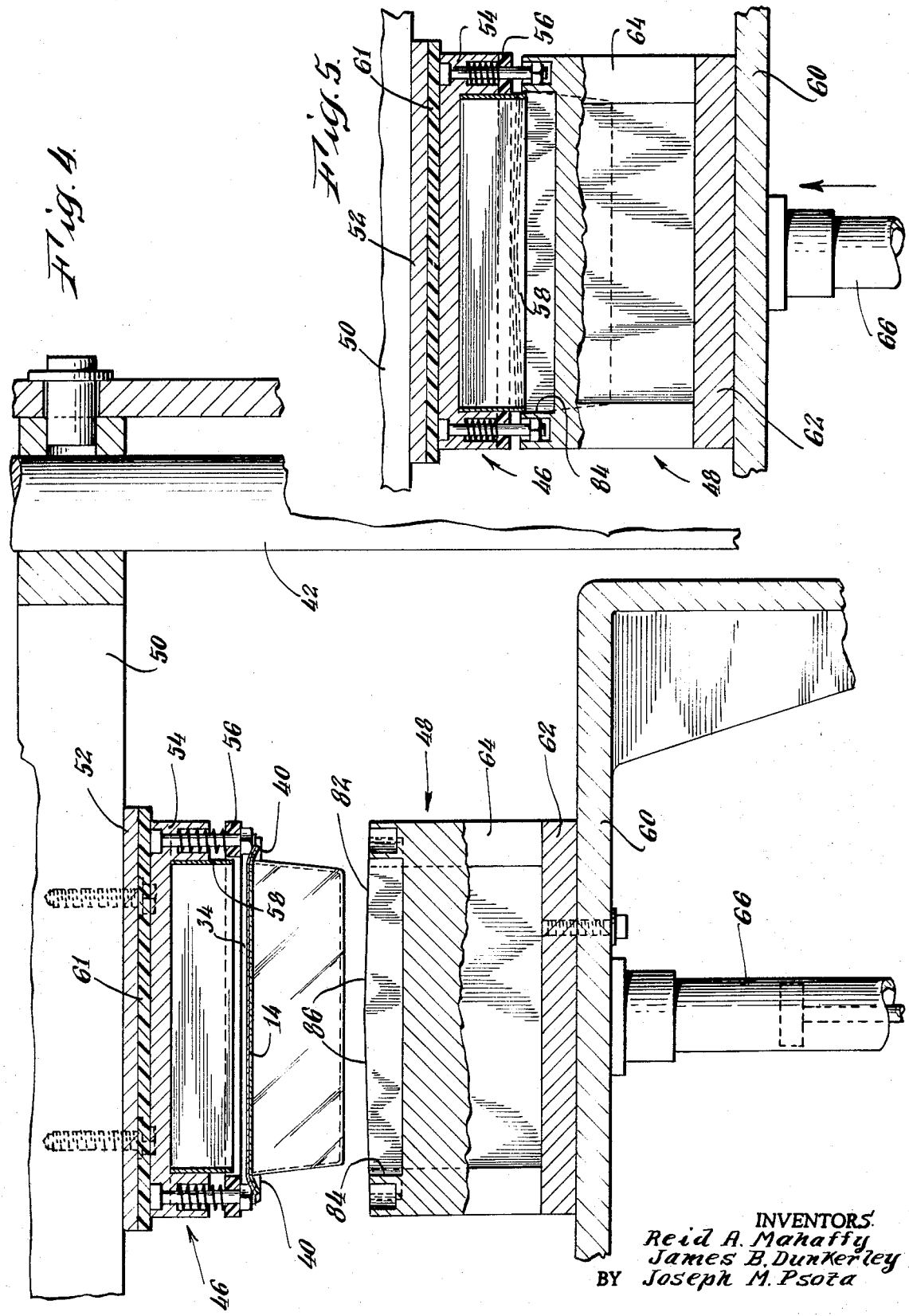

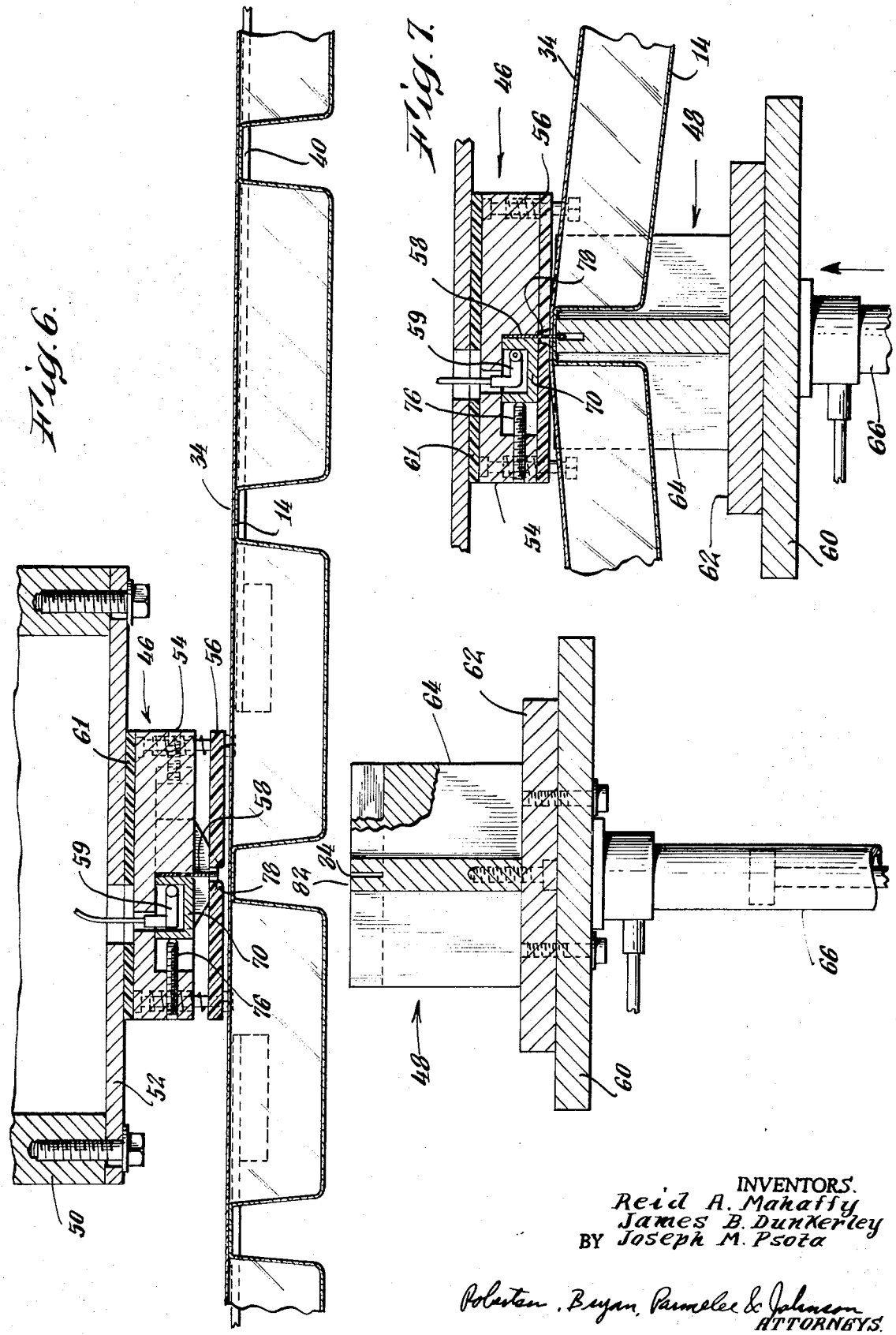

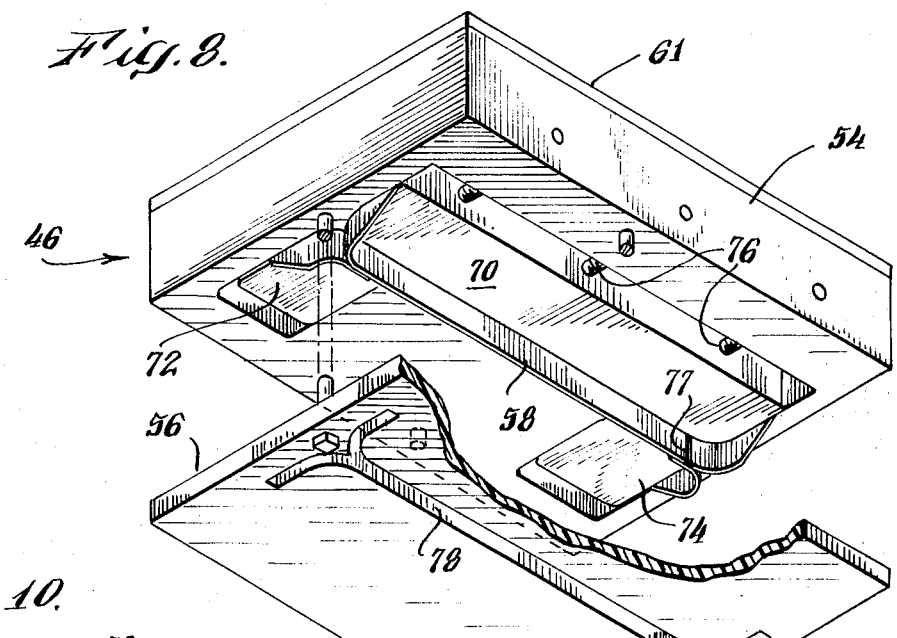
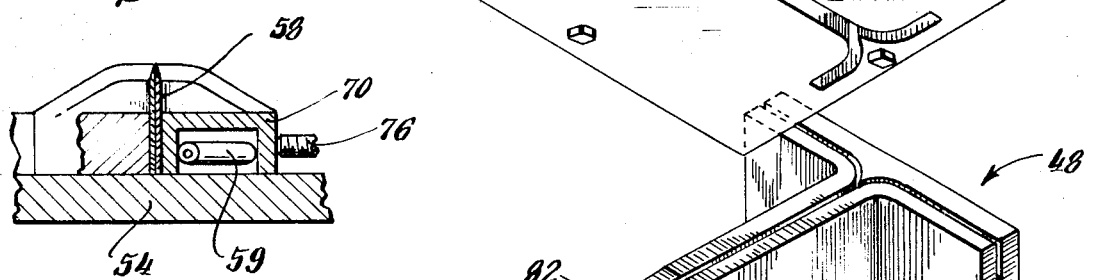
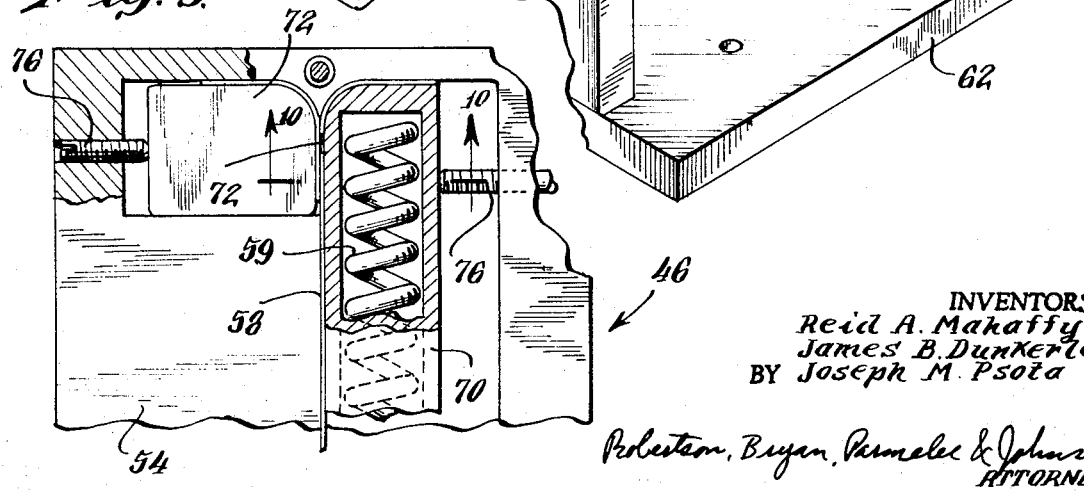

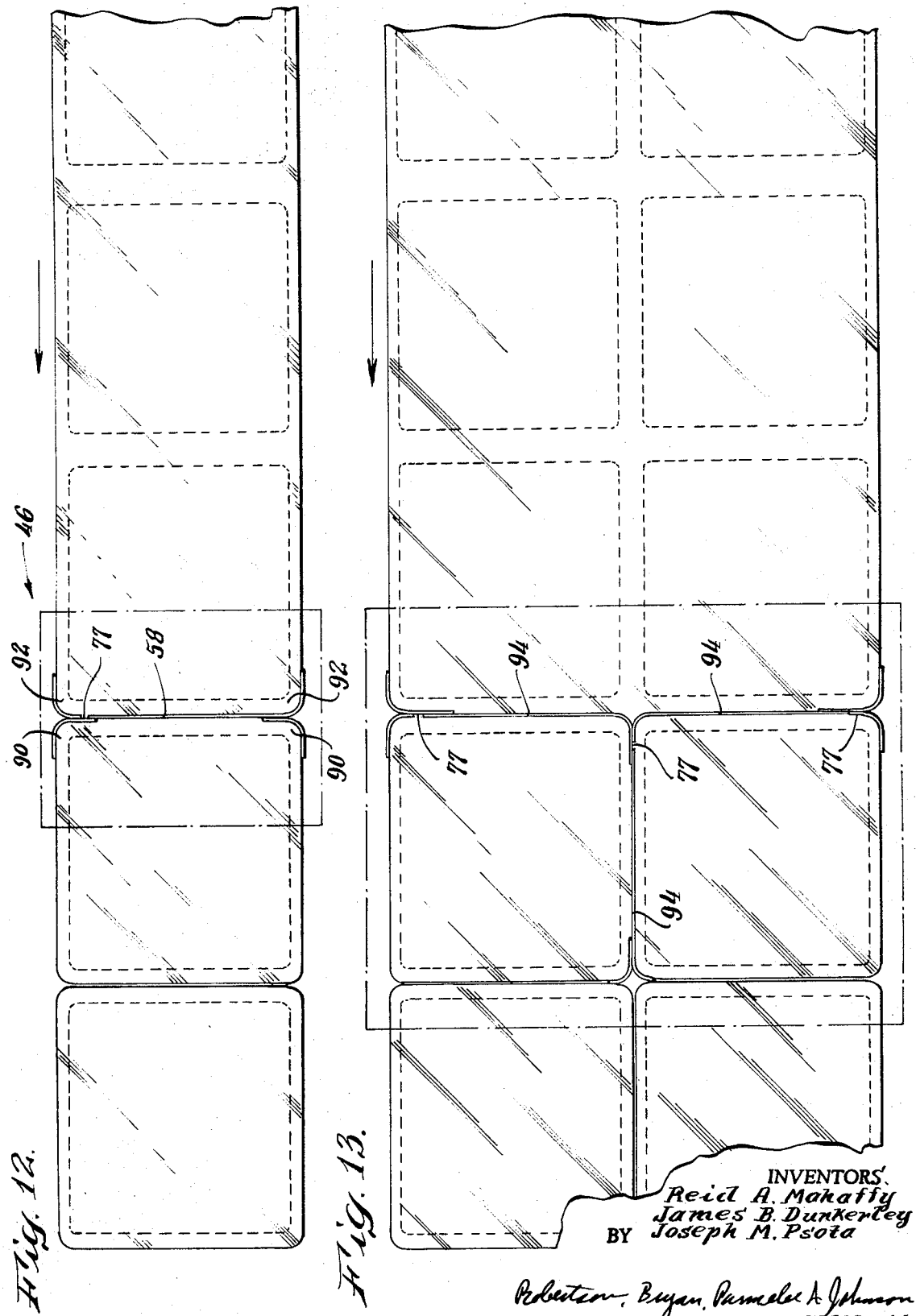

AUTOMATIC PACKAGING APPARATUS WITH IMPROVED MEANS FOR CUTTING AND CONTOUR TRIMMING OF PACKAGES

This invention relates to automatic packaging apparatus adapted to make plastic packages comprising a cup-shaped receptacle containing a product and covered by a closure top sealed to peripheral flanges of the receptacle. More particularly, this invention relates to such apparatus having improved means for severing the individual packages from the continuous sheets of plastic materials from which they are made, and, where required, rounding the corners of these packages and/or imparting other contoured trimming.

A variety of packaging machines have been developed for coverting rolls of plastic film into sealed containers. Reference may be made, for example, to U.S. Pat. No. 3,000,157, issued Sept. 19, 1961, and also to copending application Ser. No. 010,822, filed by Joseph M. Psota et al. on Feb. 12, 1970. Such machines as are disclosed therein are designed to form, fill, and seal plastic packages consisting of thermoformed cup-shaped portions containing the products to be packaged and having sealing flanges lying in a single plane to which the closure film is adhered. Packages of such construction are widely used for food products, as well as other products, and are often merchandised without any outer packaging whatsoever.

The flanges of packages of the construction described must, in order to be acceptable to users, have smooth edges and rounded corners. The requirement for smooth edges and rounded corners becomes especially important when the thickness of the flanges of the thermoformed package portions exceeds approximately 0.005 inch in thickness, e.g. into the range of thickness sometimes referred to as semi-rigid plastic. In general, sharp edges are unacceptable to users. Sharp, square corners of heavy plastic may readily cut the hands of those attempting to handle them. Any sharp points such as may occur from incomplete cuts or at the junction of two cuts are unsatisfactory. Moreover, the sharp edges may cut through the film closures of adjacent packages.

For the reasons described above, manufacturers of form, fill, and seal machines have found it essential to equip the machines with trimming devices to provide smooth flange edges. Likewise, manufacturers of preformed packages of similar construction intended for comparable usages have found it necessary to trim the flanges of their packages to smooth rounded configuration.

Four principal types of cutting devices have been used in the past on machines of the type disclosed. One type is the metal-to-metal shear with cutting action similar to ordinary scissors. The shear cutter is economical to manufacture, and produces excellent results where only straight cuts are to be made, but is expensive to manufacture and difficult to maintain when contour cuts are desired.

A second type of cutting device which has been widely used is the so-called steel rule type which is widely used for cutting and creasing paperboard, and for contour cutting of leather, plastics, etc. This type consists of a knife with its cutting edge lying essentially in a single plane and curved to the desired shape. This knife is pressed with great force against a plane surface having either a hard or a resilient face. The steel rule cutter is economical to manufacture, adapts to a variety of contours including branched cuts, i.e. in the general shape of a "Y", and does not require precision, but requires very high pressure, and has the inability to reliably produce really clean cuts.

A third type of cutting device consists of a knife somewhat similar to the steel rule type, but has a sharpened edge which does not lie in a single plane, and which works against a narrow slot. This type produces very satisfactory results for straight cuts in semi-rigid plastics, alone or in combination with thin flexible film cover stock, but is not satisfactory for making branched cuts. It requires low pressure and relatively little precision.

The fourth type which has been used most often for form, fill, and seal machines is the familiar male punch and female die of the type commonly used for sheet metal. This type, when properly designed and precisely built, produces excellent results with most plastic materials, but requires great rigidity and precision both in the cutting parts and in the press in order to produce satisfactory results, especially when thin, flexible closure films are being cut. The required construction is very expensive to design and manufacture, and requires exceptional skill to maintain. Furthermore, a substantial premium in expense is required to produce and provide for maintenance of each new design since it is often necessary to stock complete spare sets of the costly cutting tools.

Packages such as described above consisting of thermoformed cups made of semi-rigid plastic and having planar flanges with sealed-on flexible film closures are usually made of sealant combinations which can be peeled apart rather easily with the fingers, to facilitate opening. In at least one location of the flange periphery, the heat seal line is displaced a moderate distance inwardly of the outer trim lines to provide at least one location (often marked "open here") where the two films can be gripped with the fingers to start peeling the closure from the cup. Packages which have been cut and trimmed by conventional cutting means such as described above tend to become unsightly due to separation of the two films in other than the finger gripping areas.

Accordingly, it is the principal object of this invention to provide superior packaging apparatus. Another object is to overcome or mitigate certain disadvantages of prior art such as described above. A more specific object of this invention is to provide novel package severing means which is reliable in operation, relatively inexpensive to manufacture, and simple to maintain.

Other objects, aspects and advantages of the invention will in part be pointed out in, and in part apparent from, the following description considered together with the accompanying drawings, in which:

FIG. 1 is an elevational longitudinal sectional view showing the main operating elements of a packaging machine incorporating the present invention;

FIG. 2 is a plan view of the cutting station;

FIG. 3 is a side view of the cutting station with parts broken away exposing the operating elements;

FIG. 4 is an elevational sectional view of the operating elements taken along line 4—4 in FIG. 3;

FIG. 5 is an elevational sectional view of the operating elements in the cutting position;

FIG. 6 is an elevational sectional view of the operating elements taken along line 6—6 in FIG. 2;

FIG. 7 is an elevational sectional view of the operating elements in the cutting position;

FIG. 8 is an exploded perspective view of the operating elements;

FIG. 9 is a plan view of the knife-supporting block with parts broken away exposing a heating element;

FIG. 10 is an elevational sectional view of the knife taken along line 10—10 in FIG. 9;

FIG. 11 is an elevational side view in partial section showing an alternative construction for the operating elements where the rake is located on the knife;

FIG. 12 is a plan view showing one knife configuration for cutting a single chain of packages; and FIG. 13 is a plan view of one knife configuration for cutting dual chains of packages.

Referring first to FIG. 1, there is shown a packaging machine including a pair of side-by-side endless chains 10 which are moved intermittently by sprockets 12, and which carry a series of inwardly-facing clips (not shown) arranged to grip the edges of a continuous sheet 14 of plastic packaging film. Operations are performed on the plastic sheet at successive stations along the path of movement (from right-to-left along the upper reaches) to form the material into cups which are filled and hermetically sealed in known fashion.

The plastic film 14 is heated and drawn into cup shape at a heating and forming position generally indicated at 16. The apparatus at this position may be basically like that shown in the above-identified copending application, Ser. No. 010,822, and includes upper and lower reciprocable members 18 and 20 which cooperate to define a film heating station 22 preceding a vacuum drawing station 24. The operating elements of both stations are secured to pivoted arms 26 and 28 on opposite sides of the film. These arms are reciprocated (opened and closed) by rocker means 30 operated in synchronism with the intermittent indexing of the film.

After the heated plastic is formed into cups at the vacuum drawing station 24 it continues to move along the defined horizontal path and through a region in which the product is introduced to the cups by any conventional method. The filled cups are transported to a sealing station generally indicated at 32 prior to which a cover film 34 is applied to form a closure for the cups. If desired, a vacuum may be drawn at this station and if further desired, an inert gas may be admitted prior to sealing. Details of such sealing station apparatus are disclosed in copending application Ser. No. 840,131, filed by Joel A. Hamilton on July 1, 1969, now U.S. Pat. No. 3,524,298.

After the packages have been heat-sealed around the rim, i.e. at the peripheral flanges, of each cup, they are indexed further in a generally horizontal plane toward the left where they are removed from the chain clips to pass along a discharge ramp 36 (see also FIGS. 2 and 3), still in an interconnected relationship. With cups made of relatively rigid material, they will move along this ramp in an accurately spaced relationship without additional outside support, although conveyor means (not shown) may of course be provided where appropriate.

Further to the left in FIG. 1, is a cutting and trimming press station, generally indicated at 38, at which the chain of cups is cut apart and the cup flanges trimmed to the desired shape. Holes also may be cut in the flanges if desired. This press station is inclined to the horizontal at a sufficient angle to accommodate movement of the chain of cups and permit the severed individual packages to slide freely from the press, under the influence of gravity, after being severed from the continuous chain. Guides 40 are provided to support the chain of cups by their side flanges; thus no modification to the equipment is required when cutting webs with cups of various depths. The press is supported by uprights 42 which are mounted for pivotal movement about their bases 44, thus permitting adjustment of the working parts of the press in a longitudinal direction along the ramp 36, so that an accurate setting of the cutting position can be made, and so that the press may be repositioned easily to accommodate packages with different repeat lengths.

Referring to FIG. 4, the press 38 includes a stationary upper section 46 and a reciprocably movable lower section 48. The upper section comprises a support frame 50 to which is removably secured a platen 52 carrying a knife-support block or chase 54 with a spring-biased stripper 56. The knife-support block is mounted above the chain of cups to work a knife 58 against the thin cover film 34 of the continuous chain. The upper section 46 is stationary, i.e. it does not move vertically during the cutting cycle; the entire web is lifted slightly during each cutting stroke and falls after each cutting stroke (see FIGS. 6 and 7). It may also be advantageous to cycle the upper section when some portion of the web is formed above the web line.

A heating element or coil 59 is mounted within the knife-supporting block 54 to heat the knife 58 sufficiently to partially melt its way through the chain of packages as it is being cut, while tack welding the severed edges of the individual packages together. The severed packages thereby keep their neat appearance during handling and shipment since the tack welded film closure does not curl away from the more rigid cup. Further, selected positions, such as at the edge of the web, may be left uncut so that the two plies may be readily grasped by the fingers for easy opening. A heat insulator 61 mounted between the platen 52 and the knife-supporting block 54 reduces the transfer of heat from the block to the platen. The block or chase is preferably made of a good heat conducting metal such as aluminum.

The movable lower section 48 comprises a support frame 60, to which is removably secured a platen 62 carrying a knife-receiving block 64, reciprocally mounted to uprights 42 providing repetitive linear motion toward and away from the upper section 46. A pneumatic cylinder 66 mounted to the lower section 48 reciprocates the knife-receiving block in aligned relationship with the knife 58. The cutting and trimming press station 38 includes a structural frame 68 mounted to the packaging machine o hold the press in proper alignment and in predetermined relationship relative to the machine.

Referring to FIG. 8, the knife 58 is compressively mounted in the block 54 and accurately positioned therein with a sizable proportion of its overall width imbedded in the heated block. Such an arrangement permits accurate positioning and shaping of the knife with good heat conduction to the knife.

The knife 58 is preferably made from stainless steel strip approximately 0.005 to 0.012 inch in thickness and 1 inch to three fourths inch wide with a sharpened cutting edge beveled on one side only. Stainless steel strip in uniform width, accurately made and with an excellent cutting edge can be readily purchased in continuous strip.

It may be advantageous to form the knife 58 from two or more strips to facilitate branching (see also FIGS. 12 and 13). When two or more strips are employed the unbeveled sides of overlapping knife strips are placed in contact at a branched junction to form a single continuous cutting edge (see FIG. 10). The strips forming the knife are clamped securely in place by nested clamping blocks 70, 72 and 74 which are held in place by suitable clamping screws 76. The knife strips are of equal height, and have their cutting edges lying in a single plane perpendicular to the axis of movement of the press 38.

Gaps 77 are provided along the sides of the overlapping knife strips. This arrangement eliminates or at least minimizes thermal expansion problems caused by the difference in the rates of expansion of the metal used for the platen 52 and the knife 58 while retaining the ability to produce smooth cuts.

The stripper 56 is mounted to the knife-support block 54 astride the knife 58 for spring-biased movement relative thereto. The stripper is positioned to contact the chain of packages before the knife so that the package to be cut is clamped in position against the knife-receiving block 64 prior to and during the cutting operation (including "triangular" trim portions). After the cutting operation the stripper moves back to its initial position and strips away the packages and trim from the knife as the knife-receiving block is reciprocated away from the package.

The stripper 56 is preferably made of a poor heat conducting, heat resistant material such as fiber-glass reinforced epoxy resin. It is also advantageous to make the stripper as thin as practicable so that the portion of the knife 58 which must extend through the stripper opening 78 is minimized. In practice, a thickness of approximately one eighth inch has been found to be acceptable.

Alternatively, it may be advantageous to use spring-biased stripper pins 80 positioned at appropriated locations adjacent the knife 58, outside the point of bifurcation of the knife strips, to hold the triangularly shaped pieces to be removed securely in position during cutting (see FIG. 11).

The knife-receiving block 64 has its working surface of face 82 aligned with the knife 58 to reciprocate relative thereto. A mating slot 84 is arranged within the working surface to receive the knife. The working surface is contoured and elevated above the platen 62 sufficiently to clear formed cups of maximum depth, and is sufficiently narrow in width to pass between adjacent cups without interference. The slot, when working with a knife having dimensions as described above, may be approximately three sixty-fourths inches to three thirty-seconds inches wide.

The working face 82 of the knife-receiving block 64 may lie in a single plane, however the cutting force required is greatly reduced if the working face of the knife-receiving block is made with a slight rake or taper 86 so that the knife 58 gradually shears its way through the plastic material. For example, when cutting packages of plastic materials totaling approximately 0.015 inch thick and composed primarily of polyvinyl chloride, polyethylene, and polyester, at cyclic speeds of approximately 35 cuts per minute, with a total cut length of approximately 9 inches, and with the knife-supporting block 54 heated to a temperature of approximately 250° F., a displacement from the center of the working face 82 of approximately one eighth inch provides excellent cuts with reduced cutting force.

Alternatively, satisfactory cuts can be obtained by forming the working face 82 in a single plane and having the cutting edge of the knife 58 arranged with a slight rake 88 (see FIG. 11). It has been found advantageous when making branched cuts if the junction of the two knife strips is the point at which the knife engages the package first, with subsequent engagement proceeding in both directions therefrom.

Referring to FIG. 12, the knife 58 is curved and branched for operation with a single line of cups thermoformed on a form, fill, and seal packaging machine to sever individual cups from the continuous chain, and simultaneously round the trailing corners 90 of a leading cup and the leading corners 92 of the next trailing cup in line. The knife 58 extends longitudinally in a direction transverse to the line of the advancing chain of cups, and is slightly greater than the overall width of the chain. During each cutting cycle the knife 58 cuts the leading cup from the next trailing cup without waste, and produces only two triangular pieces of waste web by rounding the two corners of the leading and trailing cups, respectively.

Referring to FIG. 13, the knife and working face may be shaped in a T-configuration as shown to operate on a continuous dual chain of cups with two interconnected rows of cups abreast. This knife 94 requires two cuts to sever the individual packages and is arranged for severing the two interconnected rows of cups from each other without waste, severing a pair of cups from an adjacent pair again without waste, and rounding the corners of both cups while removing two "triangles" and one "diamond" of trim. Although the directional arrow of FIG. 12 and 13 indicates the preferred direction of indexing of the web, it will be noted that the knives are functional if the direction is reversed.

In operation of packaging machines having cutting and trimming means as described above, it has been found advantageous if the knife 58 or 94 and working face 82 approach each other rapidly, and then allowed to proceed at a relatively slower speed through the actual cut. Cutting pressures required at normal ambient temperatures, are reduced to a fraction by heating the knives and providing a rake.

It should be apparent to one skilled in the art that various modifications may be made in the method and the means disclosed by the present invention, e.g. in the knife configuration, without departing from the spirit or scope of the invention as described in the description and defined in the appended claims.

We claim:

1. In packaging apparatus of the type wherein a first sheet of plastic film is thermoformed into individual interconnected cup-shaped containers to be filled and sealed, said apparatus including means for moving the plastic sheet past a series of operating stations, and means for moving a second sheet of plastic film into closure contact with the filled thermoformed containers forming a continuous chain of sealed packages, an improved cutting station comprising:

cutting means including a curved sharpened edge for producing curved cuts in the continuous chain of sealed packages substantially matching the outline of the individual containers;

means for receiving said curved sharpened edge to enable said sharpened edge to cut completely through the continuous chain of packages, said receiving means including a working surface having a rake to enable some portions of said working surface to contact the continuous chain prior to other portions; and means for effecting relative movement to bring said curved sharpened edge into severing contact with the continuous chain of sealed packages supported by said working surface whereby the individually sealed packages are sheared from the continuous chain in the direction of the rake.

2. Packaging apparatus as claimed in claim 1 including means for orienting the chain of packages relative to the cutting station to allow the severed individually sealed package to move from the cutting station by the force of gravity.

3. Packaging apparatus as claimed in claim 1 including holding and stripping means for holding the package against said receiving means to properly position the package for cutting and for stripping the severed package from said cutting means to remove it therefrom.

4. Packaging apparatus as claimed in claim 1, wherein said curved sharpened edge is arranged transversely to the direction of movement of the chain and extends slightly beyond the parallel edges of the chain of packages whereby the corners of the packages are rounded with a minimum of waste.

5. Packaging apparatus as claimed in claim 1 for use with a chain of packages including two rows of interconnected packages wherein said curved sharpened edge is formed in a T-shape to provide severing of the individual packages from the interconnected rows with a minimum of waste.

6. Packaging apparatus as claimed in claim 1 including means for heating said sharpened edge to aid in severing the individual packages from the continuous chain of packages.

7. Packaging apparatus as claimed in claim 1, wherein said sharpened edge is bifurcated for producing at least two intersecting cuts simultaneously; and
said receiving means includes a bifurcated slot arranged to receive said bifurcated sharpened edge.

8. Packaging apparatus as claimed in claim 1, wherein said sharpened edge is bifurcated for producing at least two intersecting cuts simultaneously;
said receiving means includes a bifurcated slot arranged to receive said bifurcated sharpened edge; and
means is provided for heating said sharpened edge to aid in severing the individual packages from the continuous chain of packages.

9. In packaging apparatus of the type wherein a first sheet of plastic film is thermoformed into individual interconnected cup-shaped containers to be filled and sealed, said apparatus including means for moving the plastic sheet past a series of operating stations and means for moving a second sheet of plastic film into closure contact with the filled thermoformed containers forming a continuous chain of sealed packages, an improved cutting station comprising:

means for cutting the continuous chain of sealed packages to form severed individually sealed packages, said cutting means including a bifurcated knife for producing at least two intersecting cuts simultaneously;

said knife being formed of at least two knife strips sharpened only on one side of their cutting-edges and positioned with the unsharpened sides in overlapping contact forming a continuous cutting edge, said two knife strips extending in different directions away from the overlapping region;

said overlapping sides including gaps to allow for thermal expansion and contraction;

means for heating said knife to aid in severing the individual packages from the continuous chain of packages;

means for receiving said cutting means to enable said cutting means to cut completely through the continuous chain of packages, said receiving means including a bifurcated slot arranged to receive said bifurcated knife; and means for effecting relative movement to bring said cutting means into severing contact with the continuous chain of sealed packages whereby individually sealed packages are severed from the continuous chain of packages.

10. In packaging apparatus of the type wherein a first sheet of plastic film is thermoformed into individual interconnected cup-shaped containers to be filled and sealed, said apparatus including means for moving the plastic sheet past a series of operating stations and means for moving a second sheet of plastic film into closure contact with the filled thermoformed containers forming a continuous chain of sealed packages, an improved cutting station comprising:

means for cutting the continuous chain of sealed packages to form severed individually sealed packages, said cutting means including a bifurcated knife for producing at least two intersecting cuts simultaneously;

said knife being formed of at least two knife strips sharpened only on one side of their cutting-edges and positioned with the unsharpened sides in overlapping contact forming a continuous cutting edge;

means for heating said knife to aid in severing the individual packages from the continuous chain of packages;

means for receiving said cutting means to enable said cutting means to cut completely through the continuous chain of packages, said receiving means including a bifurcated slot arranged to receive said bifurcated knife; and means for effecting relative movement to bring said cutting means into severing contact with the continuous chain of sealed packages whereby individually sealed packages are severed from the continuous chain of packages.

* * * * *